United States Patent [19]

Merry

[11] Patent Number: 5,171,341
[45] Date of Patent: Dec. 15, 1992

[54] CONCENTRIC-TUBE DIESEL PARTICULATE FILTER

[75] Inventor: Richard P. Merry, St. Paul, Minn.

[73] Assignee: Minnesota Mining and Manufacturing Company, St. Paul, Minn.

[21] Appl. No.: 784,149

[22] Filed: Oct. 30, 1991

Related U.S. Application Data

[63] Continuation of Ser. No. 682,100, Apr. 5, 1991, abandoned.

[51] Int. Cl.$^5$ .................................... B01D 46/00
[52] U.S. Cl. .................................... 55/484; 55/520; 55/523; 55/DIG. 30; 55/527; 60/311; 60/299; 422/174; 422/180
[58] Field of Search ............... 55/484, 520, 523, 527, 55/DIG. 30; 60/311, 299; 422/174, 180

[56] References Cited

U.S. PATENT DOCUMENTS

| | | | |
|---|---|---|---|
| 3,869,267 | 3/1975 | Gaylor | 55/492 |
| 3,920,428 | 11/1975 | Kinsley, Jr. | 55/528 |
| 4,264,346 | 4/1981 | Mann | 55/523 |
| 4,276,071 | 6/1981 | Outland | 55/523 |
| 4,324,572 | 4/1982 | Erdmannsdorfer | 55/385 |
| 4,376,637 | 3/1983 | Yang | 55/2 |
| 4,427,418 | 1/1984 | Kogiso et al. | 55/287 |
| 4,456,457 | 6/1984 | Nozawa et al. | 55/283 |
| 4,543,113 | 9/1985 | Forester et al. | 55/378 |
| 4,576,799 | 3/1986 | Worner | 422/176 |
| 4,613,350 | 9/1986 | Forester et al. | 55/527 |
| 4,813,231 | 3/1989 | Bykowski | 60/274 |
| 4,940,476 | 7/1990 | Buck | 55/DIG. 30 |
| 5,042,249 | 8/1991 | Erdmannsdoerfer | 60/299 |

FOREIGN PATENT DOCUMENTS

| | | |
|---|---|---|
| 0275372 | 1/1990 | European Pat. Off. |
| 3545762 | 7/1987 | Fed. Rep. of Germany |
| 3731766 | 3/1989 | Fed. Rep. of Germany |
| 3800723 | 7/1989 | Fed. Rep. of Germany |
| 3801634 | 8/1989 | Fed. Rep. of Germany |
| 3806131 | 8/1989 | Fed. Rep. of Germany |
| 3910554 | 10/1989 | Fed. Rep. of Germany |
| 3823205 | 1/1990 | Fed. Rep. of Germany |
| 2193656 | 2/1988 | United Kingdom |

OTHER PUBLICATIONS

Sales Brochure entitled "Filter Cartridge Sealing Systems," from Filterite (a Brunswick Corporation) of Timonium, MD, Bulletin No. 1795.

Japanese Abstract No. 56-46405 (Sumiyoshi), published Oct. 7, 1982.

SAE Technical paper Series, 870015, Titled "Experiences in the Development of Ceramic Fiber Coil Particulate Traps," 1987, H. O. Hardenberg and H. L. Daudel, pp. 67–78.

SAE Technical Paper Series, 870011, titled "Urban Bus Application of a Ceramic Fiber Coil Particulate Trap," 1987, H. O. Hardenberg, pp. 17–25.

*Primary Examiner*—Bernard Nozick
*Attorney, Agent, or Firm*—Gary L. Griswold; Walter N. Kirn; Gerald F. Chernivec

[57] ABSTRACT

An efficient, economical, compact diesel particulate filter comprising a casing with a plurality of concentric, spaced, perforated, supported, substantially rigid tubes substantially filling the casing radially, wherein the perforated surface of each tube is covered by a filtering element comprising substantially helically wound inorganic yarn, wherein each space between tubes is blocked at only one end of the tubes so that exhaust entering an unblocked space at one end of the casing passes radially inwardly and outwardly through filtering elements before exiting through an unblocked space at the other end of the casing.

22 Claims, 3 Drawing Sheets

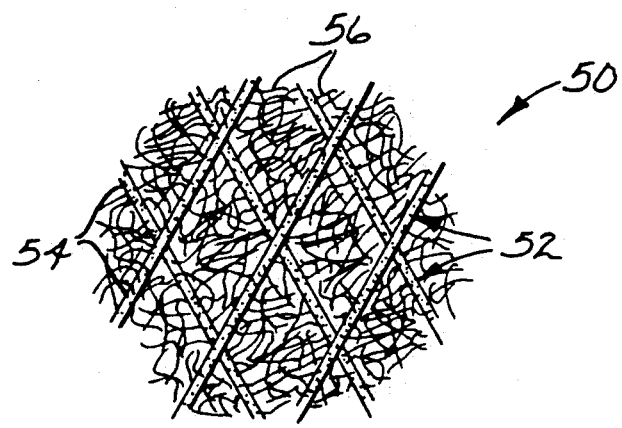
Fig. 4
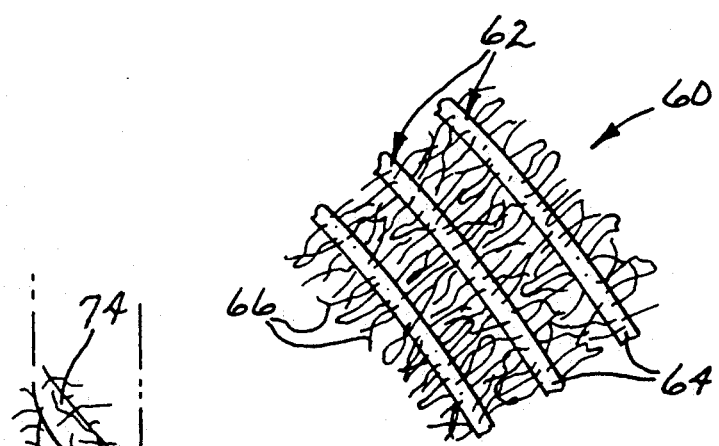
Fig. 5
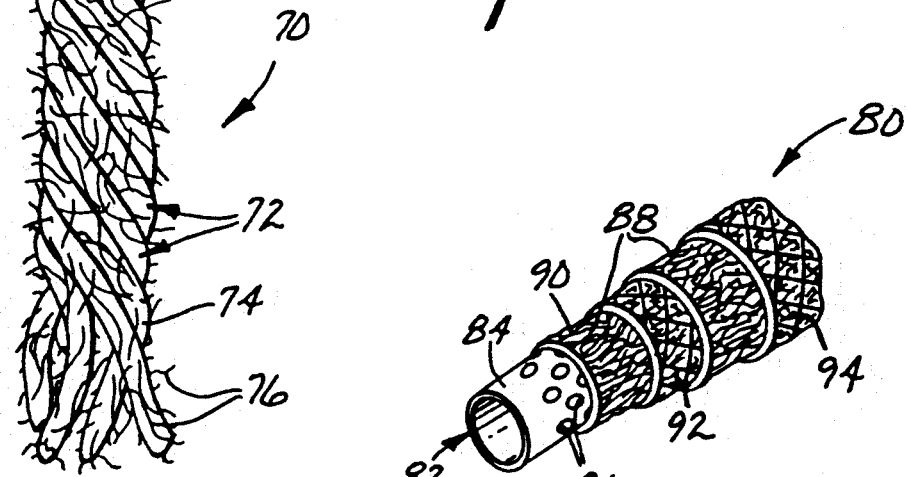
Fig. 6
Fig. 7

CONCENTRIC-TUBE DIESEL PARTICULATE FILTER

This is a continuation of application Ser. No. 07/682,100 filed Apr. 5, 1991, now abandoned.

FIELD OF THE INVENTION

This invention relates to filters or traps that remove particulates from the exhaust of diesel engines.

BACKGROUND ART

Diesel engines emit a hazardous, sooty exhaust that can be rendered less hazardous by using diesel particulate filters. Known diesel particulate filters, however, unduly increase fuel consumption and tend to have poor durability.

Known diesel particulate filters can be divided into four categories or types, wherein the first type is characterized by having a ceramic wallflow monolith, the second type having a rigid ceramic foam, the third type having a mass of fibrous filter material, and the fourth type having one or more hollow, perforated, metal tubes. Each filter type can have an elongated tubular casing adapted for connection to an exhaust system. Further, each filter type can be periodically regenerated during use by burning off the collected particulate matter.

An example of a first-type diesel particulate filter is shown in U.S. Pat. No. 4,276,071 (Outland).

Offenlegungsschrift No. DE 38 06 131 (Giebling), laid open Aug. 31, 1989, describes a method of making a modified first-type diesel particulate filter, wherein a paste-like ceramic structural material bearing a mesh including parallel, spaced filaments is wound up into a roll that is inserted into a tubular casing and then fired to produce a porous ceramic soot-filter body.

Examples of second-type diesel particulate filters are shown in U.S. Pat. Nos. 4,264,346 (Mann) and 4,813,231 (Bykowski). A problem common to both the first and second type filters is that due to their rigid nature, they are prone to cracking when subjected to thermal stresses and vibrations, such as, for example, those encountered when the filters are used in automobiles or other vehicles.

One example of a third-type diesel particulate filter is disclosed in Offenlegungsschrift No. 35 45 762 (Brich) laid open Feb. 7, 1987, wherein woven mats are placed in a cylindrical housing so that they are coaxial with the centerline of the housing. The housing appears to have an axial gas inlet and an axial gas outlet. The exhaust gas appears to pass radially through the woven mats. In one embodiment, ceramic fiber mats are rolled up tightly and fill the entire cross-section of the housing. This embodiment optionally has a metallic web rolled together in a spiral fashion with the ceramic fiber mat so that they become enmeshed around the axis.

Offenlegungsschrift No. DE 38 01 634 (Stöpler et al.), laid open Aug. 3, 1989, discloses a third-type diesel filter wherein several layers of cylindrical filter elements are arranged in a housing unit between an inlet and outlet funnel to be radially traversed by the exhaust gases, wherein the filter elements have an essentially circular or oval cross-section with an equidistant radial spacing under the formation of inlet and outlet channels, and wherein each filter element comprises a gas-permeable filter-body of wire-mesh, ceramic fibers, or a combination thereof, enclosed at both sides by a gas-permeable metallic cover-sheet. Further, by using spacer elements, the filter-body can be wound to form a wrapper with a spiral inlet and outlet channel, each closed at the opposite side, wherein the enclosing covers formed by perforated metallic sheets or metallic weaves are provided with a catalytic coating for converting the gaseous pollutants.

An example of a fourth-type diesel particulate filter is shown in U.S. Pat. No. 4,324,572 (Erdmannsdörfer), wherein a plurality of parallel, spaced, rigid, perforated, hollow tubes (designated "support pipes") extend substantially the length of the casing. Threads of spun silicon dioxide or silica fiber are wound on each of the tubes to provide filtering elements. Each tube is plugged at the inlet, while channels between the tubes are blocked by a wall at the outlet, forcing the exhaust to pass through the filtering elements. The threads are said to preferably be cross-wound to allow oxygen to reach the soot deposits during periodic burn-off of collected particulate matter.

Offenlegungsschrift No. DE 37 31 766 (Buck), laid open Mar. 30, 1989, discloses another fourth-type diesel particulate filter having an enclosure with an inlet and outlet connection pipe, wherein ceramic fibers or yarns are placed inside the enclosure.

U.S. Pat. No. 4,576,799 (Wörner), discloses yet another fourth-type diesel particulate filter comprising a plurality of parallel, spaced, rigid, perforated, hollow tubes substantially filling an elongated casing radially and concentrically. Each of the tubes consists of a filtering element sandwiched between an inner perforated shell and an outer perforated wall. In one embodiment, there is a barrier between adjacent tubes so that exhaust entering between two of the tubes passes radially outwardly through the filtering element before exiting through the space between the outer of those two tubes and the next barrier. In another embodiment, there are two tubes between adjacent barriers, such that the exhaust passes through the filtering elements of both tubes before reaching the outlet.

A fourth-type diesel particulate filter is also disclosed in Offenlegungsschrift No. DE 39 10 554 (Engeler et al.), laid open Oct. 19, 1989, wherein the filter comprises four concentric, rigid, hollow, perforated tubes extending substantially the length of the casing, with each space between adjacent tubes being blocked at only one end of the tubes so that exhaust entering an unblocked space passes radially inwardly or outwardly through the perforated walls of the tubes.

U.K. Pat. Appln. No. GB 2,193,656 (Henkel), published Feb. 17, 1988, discloses a fourth-type diesel particulate filter that has only one perforated hollow tube, wherein the tube is wrapped with two filtering layers, first a fine-pore woven fabric of quartz glass or ceramic fibers and then an elastic wide-mesh fabric or fleece.

A common problem associated with a fourth-type of diesel particulate filter that employs short or staple fibrous filter material is that it tends to experience fiber shedding resulting in an undesirably short life.

SUMMARY OF THE INVENTION

Briefly, the present invention provides a diesel particulate filter comprising
 (a) a casing having at least two ends;
 (b) means for connecting said ends of said casing to an exhaust system;
 (c) a plurality of concentric, spaced, perforated, supported, substantially rigid tubes (i.e., hollow cylinders)

extending between the ends of the casing, each of the tubes having at least two ends and an outer surface, and the plurality of tubes substantially filling the casing radially;

(d) filtering elements comprising inorganic yarn, the yarn being substantially helically wound around each of the tubes to cover the perforations of the tubes; and (e) means for blocking alternate spaces between ends of the tubes, with each space between the tubes being blocked adjacent to one end of the casing.

Preferably, the inorganic yarn is substantially helically cross-wound around at least one of the tubes.

The construction of the diesel filter according to the present invention allows exhaust gases to pass through adjacent tubes in opposite radial directions.

The filter of the present invention can be characterized as an improved fourth-type diesel particulate filter. The inventive filter utilizes a concentric arrangement of perforated filtering tubes that avoids any dead space. Furthermore, the concentric arrangement enables the diesel particulate filter to be of a more robust and compact construction as compared to filters in the art that utilize laterally spaced perforated filtering tubes.

In this application:

"inorganic fiber" refers to any inorganic-based fiber which is resistant to high temperature (e.g., temperatures above about 600° C.), is chemically resistant to diesel exhaust gas, and has textile qualities (i.e., is suitable for winding about the tubes comprising the inventive filter);

"yarn" means a plurality or bundle of individual fibers or filaments;

"heat-fugitive fiber" refers to a fiber comprising constituents which decompose and volatilize when heated (e.g., organic material); and "fiber segment" refers to the portion of a broken fiber protruding from the core of the yarn.

BRIEF DESCRIPTION OF THE DRAWING

The invention may be more easily understood in reference to the drawing, all figures of which are schematic. In the drawing:

FIG. 4 is a partial plan view of a substantially helically cross-wound inorganic yarn.

FIG. 5 is a partial plan view of a substantially helically wound inorganic yarn.

FIG. 6 is a plan view of a texturized ply-twisted inorganic yarn.

FIG. 7 is a partial perspective view of a filter element.

DESCRIPTION OF THE PREFERRED EMBODIMENTS

The diesel particulate filter according to the present invention provides an efficient, economical, compact system for removing particulate from diesel exhaust.

Figure 1:
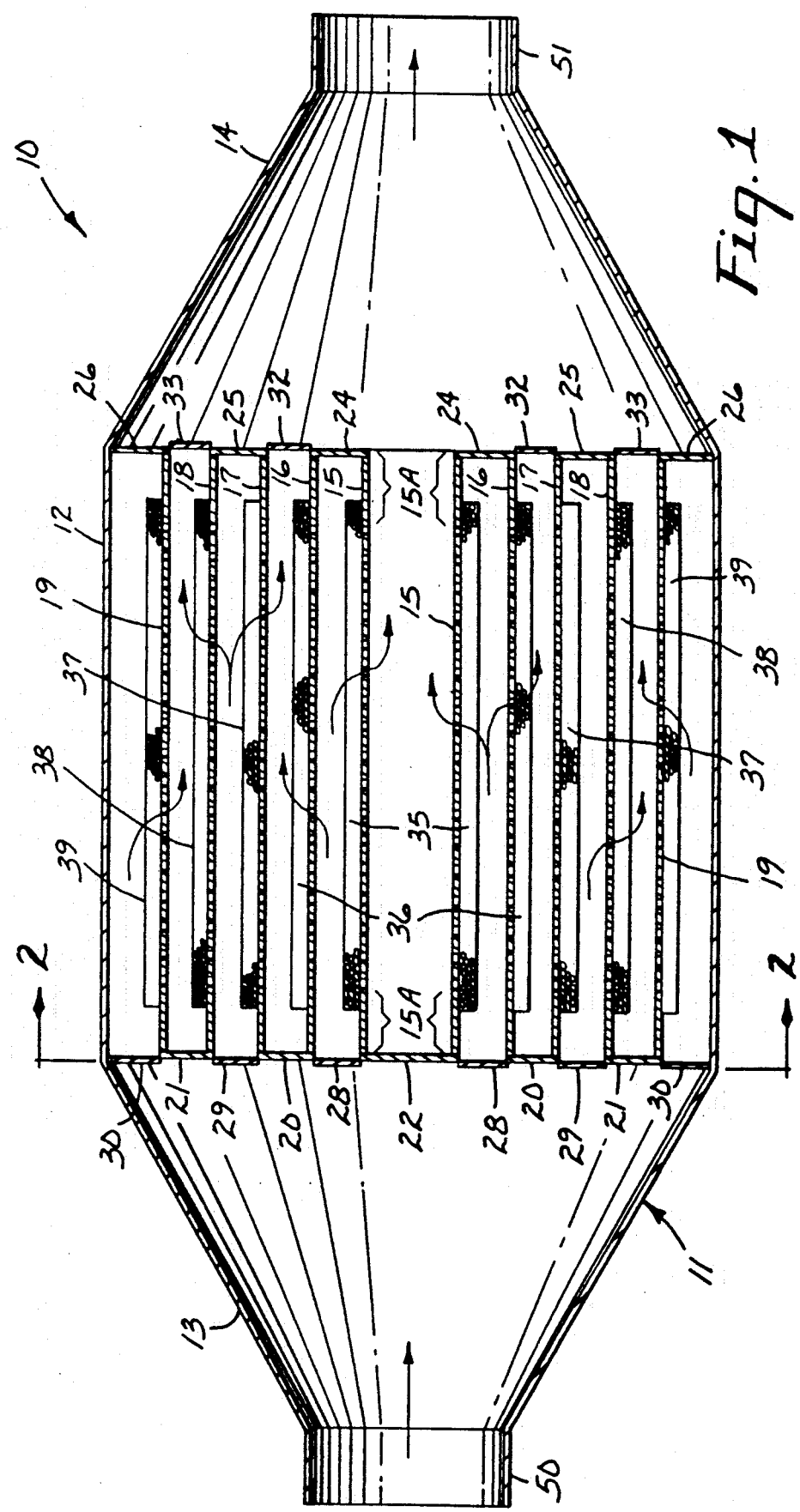
FIG. 1 is a longitudinal central section through a diesel particulate filter according to the invention.
Figure 2:
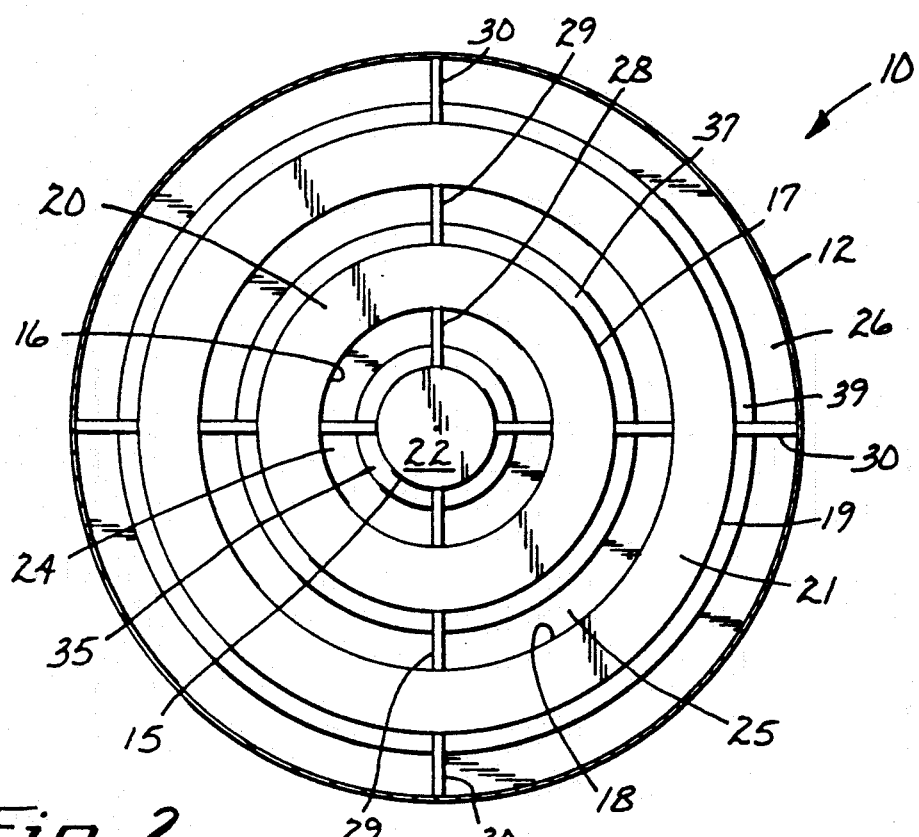
FIG. 2 is a cross-section along line 2—2 of FIG. 1.

Referring to FIGS. 1 and 2, preferred diesel particulate filter 10 has an elongated casing 11 having cylindrical body 12, conical exhaust inlet 13, and conical exhaust outlet 14. Within cylindrical body 12 and extending between inlet end 50 and outlet end 51 of casing 11 are five concentric, spaced, substantially rigid tubes 15, 16, 17, 18, and 19 that radially fill cylindrical body 12. The walls of tubes 15, 16, 17, 18, and 19 are uniformly perforated throughout their length except for an imperforate area (e.g., 15A) at each extremity of each tube. Connected to the inlet extremities of tubes 15, 16, 17, 18, and 19 are annular caps 20 and 21 and central circular cap 22. Connected to the outlet extremities of tubes 15, 16, 17, 18, and 19 are annular caps 24, 25, and 26. Caps 24, 25, and 26 block, at outlet end 51, alternate spaces between the tubes. Bridging adjacent caps at the inlet extremities of the tubes are thin struts 28, 29, and 30, the outer of which, 30, is also connected to casing 11. Adjacent caps are similarly bridged by thin struts 32 and 33 at the outlet extremities of the tubes.

Inorganic yarn is independently substantially helically wound around tubes 15, 16, 17, 18, and 19 to produce filtering elements 35, 36, 37, 38, and 39, respectively, covering the perforated surface of each of tubes 15, 16, 17, 18, and 19. Optionally, the inorganic yarn is independently substantially helically cross-wound around tubes 15, 16, 17, 18 and 19. Exhaust entering the unblocked spaces at inlet end 50 passes into spaces between tubes 15, 16, 17, 18, and 19, that are not blocked by caps 20, 21, and 22, and radially inwardly and outwardly through filtering elements 35, 36, 37, 38, and 39 before exiting through spaces not blocked by caps 24, 25, and 26, at outlet end 51.

Optionally, a nonwoven mat comprising inorganic fiber is interposed between the outer surface of at least one of tubes 15, 16, 17, 18, and 19 and the substantially helically wound or cross-wound inorganic yarn.

Optionally, fugitive yarn can be substantially helically wound or cross-wound about at least one of tubes 15 to 19, in addition to the inorganic yarn.

It is within the scope of the present invention to construct diesel particulate filter 10 such that diesel exhaust can enter outlet end 51 and exit at inlet end 50.

Figure 3:
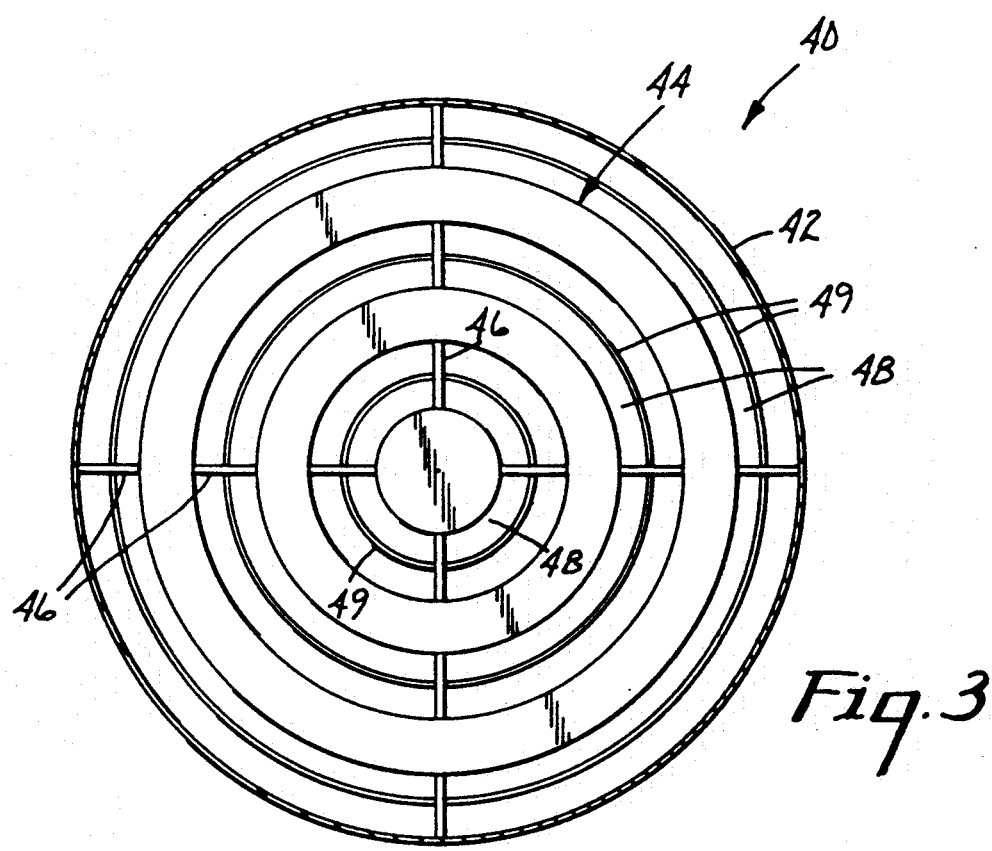
FIG. 3 is a cross-section (similar to that of FIG. 2) through a second diesel particulate filter according to the invention.

Diesel particulate filter 40, illustrated in FIG. 3, is similar in construction and function to the filter shown in FIGS. 1 and 2. Within metal casing 42 are five concentric, spaced, rigid, metal tubes (not shown), the walls of which are uniformly perforated throughout their length, except for an imperforate area at each extremity of each tube. Welded to the inlet and outlet extremities of the tubes are sheet-metal stampings, one of which 44 is shown. The stampings, which are secured to tube ends, serve both to block alternate spaces between the tubes and to structurally reinforce the filter. Integral with the stampings are metal struts 46, the outermost of which are welded to casing 42.

Against the perforated surface of each tube, a plurality of nonwoven mats 48 of inorganic fiber are held by sustantially helically wound inorganic yarn 49. Optionally, the inorganic yarn is substantially helically cross-wound.

The size and number of tubes comprising the inventive filter depend on the particular filter demands and size of the diesel engine. In general, the cost of the filter increases with an increase in the number of tubes used. On the other hand, too few tubes for a particular application may provide poor filtering of the exhaust gas.

The casing, blocking means, and struts can independently comprise any suitable material including, for example, metals or ceramics. For ease of manufacture, the preferred material is a metal. Preferably, the metal is stainless steel sheet metal. Means for connecting the casing, blocking means, and struts include those known in the art for the particular material of which the casing, blocking means and struts are comprised. For example, if the casing, blocking means, and struts are made of metal, the preferred means for connecting them is welding.

The shape of the casing can vary by convenience. Suitable shapes include, for example, those having a circular cross-section, an elliptical cross-section, a square cross-section, and a rectangular cross-section. Preferably, the casing has a circular or elliptical cross-section. The casing typically is elongated to allow it to have a slim profile.

The perforated tubes can comprise any suitable material including, for example, metals and ceramics. The perforated tubes can be, for example, a tube with holes, a wire screen, or an expanded metal, provided it is substantially rigid. Although perforated ceramic tubes may provide excellent performance, it might be unduly expensive to apply suitable blocking means. Preferably, the perforated tubes comprise a metal. More preferably, the metal is stainless steel sheet metal.

The shape of the tubes can vary by convenience, as described above for the casing. Preferably, the tubes have a circular or elliptical cross-section.

The perforations of each tube should be as large as possible while maintaining rigidity. Preferably, each perforation is of a diameter in the range from about 1 to about 20 mm, far too large to trap any particle in the exhaust. More preferably, each perforation is of a diameter in the range from about 2 to about 10 mm, and most preferably in the range from about 3 to about 7 mm.

The size of individual holes may be the same, different, or a combination thereof.

Preferably, the perforations occupy in the range from about 40 to about 80 percent of the total projected area of each tube. More preferably, the perforations occupy in the range from about 50 to about 70 percent of the total projected area of each tube. An open area substantially above 80 percent may significantly affect the structural integrity of the tube. On the other hand, an open area substantially below 40 percent, may cause undesirably high back pressures during use.

The perforations are preferably uniformly distributed over the surface of each tube, except the ends of the tubes which are preferably imperforate.

For perforated tubes having metal extremities, the blocking means are preferably sheet metal caps welded to the extremities. To enhance the structural strength, adjacent caps can be interconnected by metal struts that also connect the radially outermost caps to the casing. The struts can be welded to the caps, or the struts and caps can be integral sheet-metal stampings. Preferably, each cap blocks the spaces between two or more contiguous tubes. More preferably, each cap blocks only the space between adjacent tubes.

Each filtering element can comprise one or more layers of substantially helically wound or cross-wound inorganic yarn, or it can comprise one or more nonwoven mats comprising inorganic fibers, wherein the mat is held against the radially outward perforated surface of each tube by substantially helically wound or cross-wound inorganic yarn.

Preferably, the inorganic yarn has a diameter in the range from about 0.5 to about 5 mm. More preferably, the diameter is in the range from about 1 to about 3 mm. Yarn diameters in the specified ranges typically have superior textile qualities as compared to yarns with diameters outside of these ranges. Such yarns typically comprise in the range from about 780 to about 7800 individual inorganic fibers. Preferably, the inorganic yarn comprises in the range from about 1560 to about 4680 individual fibers.

Preferably, the inorganic yarn is ply-twisted because such a construction when texturized better maintains the original strength of the yarn, than does inorganic yarn which is not ply-twisted. Referring to FIG. 6, texturized ply-twisted yarn 70 comprises ply-twisted yarns 72 each having core 74 and fiber loops and fiber segments 76.

The inorganic fibers preferably have a diameter in the range from about 5 to about 20 micrometers. More preferably, the inorganic fibers have a diameter in the range from about 7 to about 15 micrometers, and most preferably, in the range from about 9 to about 14 micrometers. Fibers having a diameter within the specified ranges generally are easier to make and texturize than fibers having diameters outside of these ranges. Further, fibers substantially below 5 micrometers in diameter tend to be easily damaged (i.e., broken when texturized). Fibers substantially above 20 micrometers in diameter typically provide a filter which is less efficient than one comprising fibers having diameters within the specified ranges.

The inorganic fibers comprising the inorganic yarn are preferably ceramic. The ceramic fibers can be, for example, amorphous, polycrystalline, or a combination thereof.

Useful ceramic yarns include, for example, those comprising fibers made of alumina-boria-silica, alumina, silica, silicon carbide, and boron nitride. Preferably, the ceramic fiber comprises an alumina-boria-silica. To aid in handling, the yarns are typically sized using conventional techniques. Alumina-boria-silica yarns are commercially available, for example, under the trademarked designations "NEXTEL 312 CERAMIC YARN" and "NEXTEL 440 CERAMIC YARN" from the 3M Co. of St. Paul, Minn.

Texturization of the inorganic yarn improves its filter or trapping efficiency. Referring to FIG. 5, wound inorganic yarn 60 comprises inorganic yarn 62 having core 64 and fiber loops and fiber segments 66. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

In winding the yarn about the perforated tube, the winding tension is preferably as high as possible, without breaking the yarn. Typically the winding tension is in the range from about 9.8 to about 19.6 Newtons.

To increase the filtering or trapping efficiency of a filter element, the yarn is preferrably helically cross-wound around the tube. Referring to FIG. 4, cross-wound inorganic yarn 50 comprises inorganic yarn 52 having core 54 and fiber loops and fiber segments 56.

The most preferred winding arrangement of the yarn is disclosed in assignees co-pending patent application entitled "Diesel Particulate Trap Of Perforated Tubes Wrapped With Cross-Wound Texturized Inorganic Yarn To Form 4-Sided Filter Traps", U.S. Ser. No. 07/681,147, filed the same day as this application, the disclosure of which is incorporated herein by reference.

For a filtering element comprising substantially helically wound inorganic yarn, the yarn can be wound or cross-wound to a thickness that ensures entrapment of virtually all particulate matter of the exhaust. For good filtering efficiency with minimal back pressure with a filtering element comprising inorganic yarn, the yarn preferably is texturized and is substantially helically wound or cross-wound about the tube such that the core of the yarn of each successive layer is radially aligned with the core of the yarn of the underlying core, wherein the radially aligned cores collectively form relatively dense walls. Preferably, the cores of adjacent yarns of each winding layer in each winding direction are spaced by more than twice the width of the cores, while maintaining the full openness of the protruding fiber segments and fiber loops, and the fiber segments and fiber loops of adjacent turns intermesh. In effect, the yarn becomes compacted only where its core is contacted by an overlying core and the protruding fiber segment and fiber loops extend into openings between the walls to provide traps for exhaust particles. Where the yarn covers the imperforate end of a tube, adjacent turns of the yarns are preferably progressively spaced more closely until the cores of adjacent turns in each layer are at the end of a filtering element and provide a dense end wall.

For a filtering element comprising substantially helically wound or cross-wound, texturized inorganic yarn having a dense core and protruding fiber segments and fiber loops, each filtering element can be made using a plurality of yarns that have the same or differing degrees of texturizing. Use of yarn that is more highly texturized at downstream layers versus upstream layers, for example, allows the full height of the fiber segment or fiber-loop-containing openings to be utilized.

For a filtering element comprising the substantially helically wound or cross-wound texturized yarn comprising inorganic fibers, it may be desirable to incorporate some heat-fugitive yarn into the windings. Referring to FIG. 7, filter element 80 comprises perforated tube 82 having perforations 86 and imperforate ends 84. Covering perforated tube 82 is non-woven mat 88 comprising microfibers 90; inorganic or heat fugitive yarn 92; non-woven mat 88; and inorganic yarn 94. The passageways left behind when the fugitive yarn is burned away during or prior to the first use of the filter may provide both reduced back pressure and enhanced access to the filtering fibers.

Suitable heat-fugitive yarn is commercially available and includes, for example, polypropylene yarn (commercially available, for example, under the trademarked designation "HURCULON" from Hercules, Inc. or Magna, Utah), and rayon yarn (commercially available, for example, under the trade designation "RAYON YARN" from Avtex Fibers of Front Royal, Va.).

For a filtering element further comprising a nonwoven mat comprising inorganic fibers, the mat preferably is selected to allow a high degree of filtering efficiency without significant back pressure. Typically, the fibers comprising the nonwoven mat have a diameter up to about 6 micrometers. Preferably, the fibers comprising the nonwoven mat have a diameter up to about 3 micrometers, wherein fibers having such a diameter can be referred to as "microfibers." A preferred nonwoven mat comprises ceramic blown microfibers. Preferably, the ceramic fibers are made of alumina-boria-silica, alumina-silica, alumina, silica, silicon carbide, or boron nitride. More preferably, the nonwoven mat comprises alumina-boria-silica blown microfibers.

Suitable nonwoven mats are commercially available, and include those marketed under the trademarked designations "ULTRAFIBER 312" and "ULTRAFIBER 440" from the 3M Co. and "SAFFIL LD MAT" from Imperial Chemicals, Inc. of Cheshire, U.K., and "FIBERFRAX" from the Carborundum Co. of Niagara Falls, N.Y.

The relative fineness and inherent large surface area of a nonwoven mat as compared to yarns of inorganic fiber, allows a filtering element comprising a nonwoven to be thinner while having the same filtering efficiency as a filter element which uses a texturized yarn of inorganic fibers. A filtering element comprising substantially helically wound or cross-wound texturized yarn of inorganic fibers, however may be more economical to produce than one incorporating one or more layers of nonwoven mat.

Preferably, the inorganic yarn used to hold the nonwoven mat in place are selected to enhance the efficiency of the filtering element. For example, a texturized inorganic yarn can be substantially helically wound or cross-wound to provide a uniform, durable outer surface to each filtering element. For a filtering element comprising more than one layer of nonwoven mat, however it may be more economical to hold the lower layers temporarily with inexpensive heat-fugitive yarn comprised of fugitive fibers that are burned away during or prior to the first use of the diesel particulate filter. The passageways left behind when the fugitive yarn is burned away may provide both reduced back pressure and enhanced access to the filtering fibers.

Preferably, each filtering element has a thickness in the range from about 1 to about 25 mm. For filtering elements comprising substantially helically wound or cross-wound, texturized yarn comprising inorganic fibers, the preferred total thickness of the wound or cross-wound fiber is in the range from about 5 to about 15 mm. For a filtering element comprising substantially helically wound or cross-wound texturized yarn and a nonwoven mat comprising inorganic fibers, the preferred thickness of the filtering element is in the range from about 3 to about 8 mm. Thicknesses substantially greater than the stated ranges may unduly increase cost and may also result in undesirably high back pressures, whereas thicknesses substantially smaller than the stated ranges may provide inadequate filtering efficiency.

To aid in the oxidation of carbon and soluble organic constituents (e.g., hydrocarbons and carbon monoxide) of diesel exhaust soot particulates, the filter element can further comprise an oxidation catalyst coated onto the inorganic yarn, inorganic nonwoven mat, or a combination thereof. Such oxidation catalysts are known in the art and include, for example, precious metals (e.g., platinum, rhodium, other platinum group metals, and silver) and base metals (e.g., copper, iron, maganese, and potassium). Methods for coating the catalyst onto the inorganic yarn and nonwoven mat are known in the art.

Optionally, the inventive diesel particulate filter further comprises means for periodic burnoff of accumulated particles, e.g., by periodically heating the exhaust to a temperature above the combustion point of the trapped particulate matter. Useful electrical combustion techniques are taught in European patent application Publ. No. 0,275,372 (Gürtler et al.), laid open Jan. 3, 1990, the disclosure of which is incorporated herein by reference.

The accumulated particles can also be burned away by heating the filter in an oven (e.g., in an air atmosphere at a temperature in the range from about 550° C. to about 900° C. for a time period typically in the range from about 1 to about 2 hours) or by connecting a gas burner to the inlet enclosure.

A preferred means for periodic burnoff of accumulated particles is disclosed in assignee's co-pending application entitled "Electrically Regenerable Diesel Particulate Trap", U.S. Ser. No. 07/680,812, filed the same date as this application, the disclosure of which is incorporated herein by reference.

Objects and advantages of this invention are further illustrated by the following examples, but the particular materials and amounts thereof recited in these examples, as well as other conditions and details, should not be construed to unduly limit this invention.

EXAMPLE 1

A diesel particulate filter substantially as shown in FIGS. 1 and 2 was constructed, except the filter had four concentric perforated tubes instead of five. The cylindrical body was made of 1.6 mm thick 304 stainless steel sheet material. The four 158.7 mm long perforated tubes made from 1.2 mm thick 304 stainless steel sheet material, had diameters of about 25.4 mm, about 50.8 mm, about 76.2 mm, and about 101.6 mm, respectively. The 4 mm diameter circular perforations extended over a length of about 133.3 mm and were positioned on about 4.8 mm staggered centers. The caps and struts were made of 1.2 mm thick 304 stainless steel sheet material.

Each tube was wound with 2/2, 1.5z, 1800-denier alumina-boria-silica ceramic yarn (commercially available under the trademarked designation "NEXTEL 312 CERAMIC YARN" from the 3M Co.) which had been texturized using an air jet texturizing machine (commercially available under the trademarked designation "MODEL 17 SIDEWINDER" with a "MODEL 52D JET" from Enterprise Machine and Development Corp. of New Castle, Del.). The speed of the texturizing machine was set at about 26.5 meters per minute. The jet was opened about ¾ of a turn from its most closed position. The air pressure was set at about 690 KPa. The texturized yarn was substantially helically cross-wound at an angle of 45° with a spacing between yarn centers of about 5 mm, to provide a layered filtering element having a filter thickness of around 9.5 mm over a length of about 145 mm. The winding around the tubes was done using a 3-axis computer controlled precision winding machine (Automation Dynamics of Signal Hills, Calif.). The effect of this positioning of the yarn was that the cores of the yarns of adjacent layers were radially aligned to provide a diamond pattern, with filament loops and fiber segments extending into the openings to act as traps for particles of soot.

The cross-wound tubes were heated to about 600° C. for about one hour to remove the sizing on the fibers of the yarn. The caps and struts were then welded in place, and the resulting filter assembly inserted into the cylindrical body. Flanges were attached to the cylindrical body so that a conical exhaust inlet and outlet could be attached and later removed. Before attaching the inlet and outlet, the assembly was weighed.

The diesel particulate filter was connected to one bank of a dual exhaust system of a 6.2-liter diesel engine incorporated into a truck (1984 Chevrolet Suburban). The truck was driven for about 58 minutes over a distance of about 91 km. The amount of soot collected, which was about 5.3 grams, was determined by weighing the filter before and after the test.

The pressure which the filter was subjected to was measured both before and after the road test using a conventional flow bench having a blower with adjustable air flow, and having a connection pipe about 5 cm in diameter. The results are shown in Table 1, below.

TABLE 1

| Air Flow (M³/hr) | ΔP Clean Filter (cm H₂O) | ΔP Loaded Filter (cm H₂O) |
| --- | --- | --- |
| 34 | 1.3 | 19.6 |
| 51 | 3.6 | 27.9 |
| 68 | 5.1 | 35.6 |
| 85 | 6.9 | 41.9 |
| 102 | 9.4 | 49.8 |
| 119 | 12.7 | 58.9 |
| 136 | 17.0 | 66.3 |
| 153 | 19.6 | 77.7 |
| 170 | 24.6 | 85.8 |
| 187 | 28.7 | 87.6 |
| 204 | 34.8 | 108.0 |

These test results demonstrate that the diesel particulate filter of Example 1 is effective for collecting soot from the exhaust of a diesel engine. Use of the diesel particulate filter did not result in a significant reduction in driving performance of the vehicle.

EXAMPLE 2

A diesel particulate filter substantially as shown in FIGS. 1 and 2 was constructed as described in Example 1, except the filter contained 5 concentric tubes having diameters of 25.4 mm, 50.8 mm, 76.2 mm, 101.6 mm, and 127.0 mm.

The filter was tested in the same vehicle as described in Example 1, except under steady state conditions wherein the exhaust flow was about 204 m³/hr.

The particle trapping efficiency of the filter was measured using conventional multiple batch filter sampling at the inlet (i.e., upstream) and outlet (i.e., downstream) of the filter, using the filter handling procedures outlined in 40 CFR §86.1339-88 (1989), the disclosure of which is incorporated herein by reference. The membrane filters used were 47 mm in diameter (commercially available under the trademarked designation "PALLFLEX TEFLON MEMBRANE FILTERS" from Pallflex Products Corp. of Putnam, Conn.

To calculate the efficiency of the diesel particulate filter, the mass concentration or the downstream sample (i.e., the amount of soot in the downstream membrane filter divided by the volume of the sample) was divided by the mass concentration of the upstream sample (i.e., the amount of soot in the upstream membrane filter divided by the volume of the sample). This quotient was subtracted from unity and the result multiplied by 100.

The amount of soot collected was about 9 grams. The pressure drop across the diesel particulate filter was determined as described in Example 1. The efficiency of the particulate filter at the beginning of the test, with a pressure drop across the filter of about 36 cm of water, was about 65%. The efficiency of the particulate filter at the end of the test, with a pressure drop across the filter of about 196 cm of water, was about 91%.

These results demonstrate that the diesel particulate filter of Example 2 is effective for collecting soot from the exhaust of a diesel engine without a significant reduction in driving performance.

Although the filters constructed for Example 1 and 2 used uniformly spaced tubes, a nonuniform spacing may be desirable for better flow distribution (e.g., by somewhat closer spacing between the larger diameter tubes).

In the filters of Examples 1 and 2, alternate spaces were blocked at each end of the tubes, and exhaust entering one of those spaces passes through only one filtering element. Alternatively, two consecutive spaces could be blocked, forcing the exhaust to pass through two filtering elements.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A diesel particulate filter comprising
   (a) a casing having at least two ends;
   (b) means for connecting said ends of said casing to an exhaust system;
   (c) a plurality of concentric, spaced, perforated, supported, substantially rigid tubes extending between said ends of said casing, each of said tubes having at least two ends and an outer surface, and said plurality of tubes substantially filling said casing radially;
   (d) filtering elements comprising inorganic yarn, said inorganic yarn being substantially helically wound around each of said tubes to cover said perforations; and
   (e) means for blocking alternate spaces between said tubes at ends of said tubes, with each space between said tubes being blocked adjacent to one of said ends of said casing.

2. The diesel particulate filter according to claim 1 wherein said inorganic yarn is substantially helically cross-wound about at least one of said tubes.

3. The diesel particulate filter according to claim 1 wherein said casing, said perforated tubes, and said blocking means comprise a metal.

4. The diesel particulate filter according to claim 3 wherein said blocking means comprise metal caps welded to said ends of said tubes.

5. The diesel particulate filter according to claim 4 wherein each cap that covers a space between tubes covers only said space between two adjacent tubes.

6. The diesel particulate filter according to claim 4 wherein each cap that covers a space between said tubes covers at least two adjacent spaces between said tubes.

7. The diesel particulate filter according to claim 1 wherein said inorganic yarn comprises ceramic fibers.

8. The diesel particulate filter according to claim 7 wherein said ceramic fibers comprise an alumina-boria-silica ceramic.

9. The diesel particulate filter according to claim 6 wherein said inorganic yarn is a texturized ply-twisted inorganic yarn having at least one of fiber segments and loops of continuous fibers protruding outwardly from a dense core to provide traps for exhaust particles.

10. The diesel particulate filter according to claim 9 wherein each of said filtering elements has a thickness in the range from about 1 to about 25 mm.

11. The diesel particulate filter according to claim 1 wherein a nonwoven mat comprising inorganic fibers, is interposed between at least one of said outer surfaces and said substantially helically wound inorganic yarn.

12. The diesel particulate filter according to claim 11 further comprising alternating layers of said nonwoven mat and said substantially helically wound inorganic yarn.

13. The diesel particulate filter according to claim 11 wherein said nonwoven mat comprises ceramic blown microfibers.

14. The diesel particulate filter according to claim 13 wherein said ceramic blown microfibers comprise alumina-boria-silica.

15. The diesel particulate filter according to claim 1 wherein each of said perforations are uniformly spaced and wherein said ends are imperforate.

16. The diesel particulate filter according to claim 1 wherein said perforations occupy in the range from about 40 to about 80 percent of the total projected area of each of said tube.

17. The diesel particulate filter according to claim 1 wherein said perforations occupy in the range from about 50 to about 80 percent of the total projected area of each of said tubes.

18. The diesel particulate filter according to claim 1 wherein each of said perforations have a diameter in the range from about 1 to about 20 mm.

19. The diesel particulate filter according to claim 1 wherein each of said perforations have a diameter in the range from about 2 to about 10 mm.

20. The diesel particulate filter according to claim 1 wherein said filtering element further comprises a heat-fugitive yarn substantially helically wound about at least one of said tubes.

21. The diesel particulate filter according to claim 1 wherein said filtering element further comprises an oxidation catalyst coated onto said inorganic yarn.

22. A diesel particulate filter comprising
   (a) a casing having at least two ends;
   (b) means for connecting said ends of said casing to an exhaust system;
   (c) a plurality of concentric, spaced, perforated, supported, substantially rigid tubes extending between said ends of said casing, each of said tubes having at least two ends and an outer surface, and said plurality of tubes substantially filling said casing radially;
   (d) filtering elements comprising ceramic yarn, said ceramic yarn being substantially helically wound around each of said tubes to cover said perforations, said ceramic yarn being a texturized ply-twisted ceramic yarn having at least one of fiber segments and loops of continuous fibers protruding outwardly from a dense core to provide traps for exhaust particles, and said ceramic yarn being substantially cross-wound about at least one of said tubes; and
   (e) means for blocking alternate spaces between said tubes at ends of said tubes, with each spaced between said tubes being blocked adjacent to one of said ends of said casing.

* * * * *

UNITED STATES PATENT AND TRADEMARK OFFICE
CERTIFICATE OF CORRECTION

PATENT NO. : 5,171,341
DATED : December 15, 1992
INVENTOR(S) : Richard P. Merry

It is certified that error appears in the above-identified patent and that said Letters Patent is hereby corrected as shown below:

Column 7, line 61, "or" should read --of--.

Signed and Sealed this

Twenty-fifth Day of January, 1994

Attest:

BRUCE LEHMAN

Attesting Officer    Commissioner of Patents and Trademarks